United States Patent
Ficarra

(10) Patent No.: US 10,567,363 B1
(45) Date of Patent: Feb. 18, 2020

(54) DETERMINISTIC REPRODUCTION OF SYSTEM STATE USING SEEDED PSEUDO-RANDOM NUMBER GENERATORS

(71) Applicant: Shape Security, Inc., Mountain View, CA (US)

(72) Inventor: Michael J. Ficarra, Sunnyvale, CA (US)

(73) Assignee: SHAPE SECURITY, INC., Mountain View, CA (US)

( * ) Notice: Subject to any disclaimer, the term of this patent is extended or adjusted under 35 U.S.C. 154(b) by 149 days.

(21) Appl. No.: 15/060,380

(22) Filed: Mar. 3, 2016

(51) Int. Cl.
H04L 29/06 (2006.01)

(52) U.S. Cl.
CPC .......... *H04L 63/08* (2013.01); *H04L 63/1441* (2013.01)

(58) Field of Classification Search
CPC ...................................................... H04L 63/08
USPC .............................................................. 726/7
See application file for complete search history.

(56) References Cited

U.S. PATENT DOCUMENTS

| | | | |
|---|---|---|---|
| 4,996,711 A * | 2/1991 | Chaum | G06Q 20/3678 380/30 |
| 5,509,076 A | 4/1996 | Sprunk | |
| 5,757,923 A * | 5/1998 | Koopman, Jr. | G06F 7/584 380/46 |
| 6,654,707 B2 | 11/2003 | Wynn | |
| 7,058,699 B1 | 6/2006 | Chiou et al. | |
| 7,107,347 B1 | 9/2006 | Cohen | |
| 7,398,553 B1 | 7/2008 | Li | |
| 7,424,720 B2 | 9/2008 | Chagoly | |

(Continued)

FOREIGN PATENT DOCUMENTS

| | | |
|---|---|---|
| CN | 101471818 | 5/2011 |
| WO | WO2004109532 | 12/2004 |

(Continued)

OTHER PUBLICATIONS

CTNF, mailed on Jun. 29, 2018, re: Timothy Dylan Peacock, U.S. Appl. No. 15/137,824, filed Apr. 25, 2016.

(Continued)

*Primary Examiner* — Peter C Shaw
(74) *Attorney, Agent, or Firm* — Hickman Palermo Becker Bingham LLP

(57) ABSTRACT

Computer systems and methods for improving the security and efficiency of client computers interacting with server computers through an intermediary computer using one or more polymorphic protocols are discussed herein. In an embodiment, a computer system comprises a memory; one or more processors coupled to the memory and configured to: generate a modified identifier for a original object based on a original identifier and a nonce; render one or more instructions that include the nonce and define a modified object that corresponds to the original object and includes the modified identifier; send the one or more instructions to a client computer, wherein the one or more instructions, when executed by the client computer, are configured to cause the client computer to send a request from the client computer with the modified identifier and the nonce; receive, from the client computer, a request with a challenge identifier and a challenge nonce; generate a test identifier based on the original identifier and the challenge nonce; determine whether the test identifier matches the challenge identifier.

20 Claims, 5 Drawing Sheets

(56) References Cited

U.S. PATENT DOCUMENTS

| | | |
|---|---|---|
| 7,480,385 B2 | 1/2009 | Weber |
| 7,500,099 B1 | 3/2009 | McElwee et al. |
| 7,707,223 B2 | 4/2010 | Zubenko et al. |
| 7,836,425 B2 | 11/2010 | Rubin et al. |
| 7,849,502 B1 | 12/2010 | Bloch et al. |
| 7,870,610 B1 | 1/2011 | Mitchell |
| 7,895,653 B2 | 2/2011 | Calo et al. |
| 8,020,193 B2 | 9/2011 | Bhola et al. |
| 8,170,020 B2 | 5/2012 | Oliver et al. |
| 8,195,953 B1 | 6/2012 | Yue |
| 8,200,958 B2 | 6/2012 | Coppola et al. |
| 8,225,401 B2 | 7/2012 | Sobel et al. |
| 8,266,202 B1 | 9/2012 | Colton et al. |
| 8,332,952 B2 | 12/2012 | Zhang et al. |
| 8,453,126 B1 | 5/2013 | Ganelin |
| 8,533,480 B2 | 9/2013 | Pravetz et al. |
| 8,555,388 B1 | 10/2013 | Wang et al. |
| 8,578,499 B1 | 11/2013 | Zhu |
| 8,589,405 B1 | 11/2013 | Estan |
| 8,615,804 B2 | 12/2013 | Mui |
| 8,650,648 B2 | 2/2014 | Howard et al. |
| 8,677,481 B1 | 3/2014 | Lee |
| 8,713,684 B2 | 4/2014 | Bettini |
| 8,726,394 B2 | 5/2014 | Maor |
| 8,738,766 B1 | 5/2014 | Kazerani |
| 8,739,284 B1 | 5/2014 | Gardner |
| 8,745,177 B1 | 6/2014 | Kazerani |
| 8,752,208 B2 | 6/2014 | Shulman |
| 8,762,962 B2 | 6/2014 | Ben-Artzi et al. |
| 8,843,820 B1 | 9/2014 | Kay |
| 8,849,985 B1 | 9/2014 | Colton |
| 8,997,226 B1 | 3/2015 | Call |
| 9,043,924 B2 | 5/2015 | Maor |
| 9,158,893 B2 | 10/2015 | Call |
| 9,225,729 B1 | 12/2015 | Moen |
| 9,225,737 B1 | 12/2015 | Call |
| 9,258,328 B2 | 2/2016 | Ibatullin et al. |
| 9,401,949 B1 * | 7/2016 | Kolam ............... H04L 67/2842 |
| 9,456,050 B1 | 9/2016 | Lepeska |
| 9,537,888 B1 | 1/2017 | McClintock |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,906,544 B1 | 2/2018 | Kurupati |
| 10,165,004 B1 | 12/2018 | Mehta |
| 2002/0194219 A1 | 12/2002 | Bradley |
| 2002/0199116 A1 | 12/2002 | Hoene et al. |
| 2004/0088651 A1 | 5/2004 | McKnight et al. |
| 2004/0117623 A1 * | 6/2004 | Kalogridis ......... H04L 63/0807 |
| | | 713/165 |
| 2005/0065888 A1 * | 3/2005 | Benaloh ................ G06F 21/10 |
| | | 705/51 |
| 2005/0108554 A1 | 5/2005 | Rubin |
| 2005/0131961 A1 * | 6/2005 | Margolus ......... G06F 17/30097 |
| 2005/0172338 A1 | 8/2005 | Sandu |
| 2005/0198099 A1 | 9/2005 | Motsinger |
| 2005/0216770 A1 | 9/2005 | Rowett et al. |
| 2005/0240999 A1 | 10/2005 | Rubin et al. |
| 2005/0251536 A1 | 11/2005 | Harik |
| 2006/0036870 A1 * | 2/2006 | Dasari ................ G06F 21/6218 |
| | | 713/182 |
| 2006/0053295 A1 | 3/2006 | Madhusudan et al. |
| 2006/0101047 A1 | 5/2006 | Rice |
| 2006/0154261 A1 | 7/2006 | Saxon et al. |
| 2006/0174323 A1 | 8/2006 | Brown et al. |
| 2006/0195588 A1 | 8/2006 | Pennington |
| 2006/0230288 A1 | 10/2006 | Fox |
| 2006/0288418 A1 | 12/2006 | Yang et al. |
| 2007/0011295 A1 | 1/2007 | Hansen |
| 2007/0064617 A1 | 3/2007 | Reves |
| 2007/0088955 A1 | 4/2007 | Lee |
| 2007/0234070 A1 | 10/2007 | Horning |
| 2007/0241174 A1 | 10/2007 | Turvey et al. |
| 2008/0208785 A1 | 8/2008 | Trefler |
| 2008/0222736 A1 | 9/2008 | Boodaei et al. |
| 2008/0320567 A1 | 12/2008 | Shulman |
| 2009/0070459 A1 | 3/2009 | Cho et al. |
| 2009/0077383 A1 | 3/2009 | De Monseignat et al. |
| 2009/0099988 A1 | 4/2009 | Stokes et al. |
| 2009/0144829 A1 | 6/2009 | Grigsby et al. |
| 2009/0158136 A1 | 6/2009 | Rossano |
| 2009/0193513 A1 | 7/2009 | Agarwal et al. |
| 2009/0199297 A1 | 8/2009 | Jerrett et al. |
| 2009/0241174 A1 | 9/2009 | Rajan |
| 2009/0249310 A1 | 10/2009 | Meijer et al. |
| 2009/0282062 A1 | 11/2009 | Husic |
| 2009/0328142 A1 * | 12/2009 | Wang ................... H04L 9/3247 |
| | | 726/2 |
| 2010/0088404 A1 | 4/2010 | Mani |
| 2010/0106611 A1 | 4/2010 | Paulsen |
| 2010/0142382 A1 | 6/2010 | Jungck et al. |
| 2010/0186089 A1 | 7/2010 | Fu et al. |
| 2010/0218253 A1 | 8/2010 | Andrew |
| 2010/0235637 A1 | 9/2010 | Lu et al. |
| 2010/0235910 A1 | 9/2010 | Ku et al. |
| 2010/0257354 A1 | 10/2010 | Johnston et al. |
| 2010/0262780 A1 | 10/2010 | Mahan et al. |
| 2010/0287132 A1 | 11/2010 | Hauser |
| 2011/0035733 A1 | 2/2011 | Horning |
| 2011/0131416 A1 | 6/2011 | Schneider |
| 2011/0154021 A1 | 6/2011 | McCann et al. |
| 2011/0154308 A1 | 6/2011 | Lobo |
| 2011/0178973 A1 | 7/2011 | Lopez et al. |
| 2011/0225234 A1 * | 9/2011 | Amit ..................... G06F 21/445 |
| | | 709/203 |
| 2011/0231305 A1 | 9/2011 | Winters |
| 2011/0255689 A1 | 10/2011 | Bolotov et al. |
| 2011/0296391 A1 | 12/2011 | Gass et al. |
| 2011/0313757 A1 | 12/2011 | Hoover et al. |
| 2011/0314297 A1 | 12/2011 | Jakobsson |
| 2012/0022942 A1 | 1/2012 | Holloway et al. |
| 2012/0030187 A1 | 2/2012 | Marano |
| 2012/0036576 A1 | 2/2012 | Iyer |
| 2012/0090030 A1 | 4/2012 | Rapaport |
| 2012/0096116 A1 | 4/2012 | Mislove et al. |
| 2012/0131645 A1 | 5/2012 | Harm |
| 2012/0198528 A1 | 8/2012 | Baumhof |
| 2012/0198607 A1 | 8/2012 | Lambertz |
| 2012/0255006 A1 | 10/2012 | Aly et al. |
| 2012/0324236 A1 * | 12/2012 | Srivastava ............... G06F 21/57 |
| | | 713/189 |
| 2013/0047255 A1 | 2/2013 | Dalcher |
| 2013/0086679 A1 | 4/2013 | Beiter |
| 2013/0219492 A1 | 8/2013 | Call |
| 2013/0239195 A1 | 9/2013 | Turgeman |
| 2013/0263264 A1 | 10/2013 | Klein et al. |
| 2013/0273882 A1 | 10/2013 | Walsh |
| 2014/0040051 A1 | 2/2014 | Ovick |
| 2014/0089786 A1 | 3/2014 | Hashmi |
| 2014/0096194 A1 | 4/2014 | Bhogavilli |
| 2014/0101236 A1 | 4/2014 | Dietrich |
| 2014/0208198 A1 * | 7/2014 | Ayoub ................ G06F 17/2247 |
| | | 715/234 |
| 2014/0298469 A1 | 10/2014 | Marion |
| 2014/0304816 A1 | 10/2014 | Klein |
| 2014/0310392 A1 | 10/2014 | Ho |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1 | 4/2015 | Kaminsky |
| 2015/0262183 A1 | 9/2015 | Gervais |
| 2015/0278491 A1 | 10/2015 | Horning |
| 2015/0281263 A1 | 10/2015 | McLaughlin |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call et al. |
| 2016/0119344 A1 | 4/2016 | Freitas Fortuna dos Santos |
| 2016/0191554 A1 | 6/2016 | Kaminsky |
| 2016/0342793 A1 | 11/2016 | Hidayat |

(56) References Cited

U.S. PATENT DOCUMENTS

| | | |
|---|---|---|
| 2016/0344769 A1 | 11/2016 | Li |
| 2016/0378989 A1 | 12/2016 | Park |
| 2017/0048260 A1 | 2/2017 | Peddemors |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0205747 A1 | 7/2018 | Ficarra |
| 2018/0255154 A1 | 9/2018 | Li |
| 2019/0081977 A1 | 3/2019 | Yang |
| 2019/0141064 A1 | 5/2019 | Call |
| 2019/0182251 A1 | 6/2019 | Jampani |
| 2019/0215304 A1 | 7/2019 | Yang |
| 2019/0245858 A1 | 8/2019 | Idika |
| 2019/0268359 A1 | 8/2019 | Zhang |
| 2019/0327265 A1 | 10/2019 | Zhao |
| 2019/0364019 A1 | 11/2019 | Yang |
| 2019/0373012 A1 | 12/2019 | Mattson |

FOREIGN PATENT DOCUMENTS

| | | |
|---|---|---|
| WO | WO2008095018 | 8/2008 |
| WO | WO2008095031 | 8/2008 |
| WO | WO2008130946 | 10/2008 |
| WO | WO2013091709 | 6/2013 |
| WO | WO 2017/074622 | 5/2017 |

OTHER PUBLICATIONS

CTNF, mailed on Mar. 9, 2017, re: Siying Yang, U.S. Appl. No. 14/925,547, filed Oct. 28, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oc. 19, 2017, re: Jarrod S. Overson, U.S. Appl. No. 15/059,080, filed Mar. 2, 2016.
NOA, dated Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, dated Dec. 18, 2017, re: Yao Zhao, U.S. Appl. No. 14/861,906, filed Sep. 22, 2015.
NOA, dated Jan. 5, 2018, re: Yao Zhao, U.S. Appl. No. 14/861,906, filed Sep. 22, 2015.
NOA, dated Jan. 9, 2018, re: Justin D. Call, U.S. Appl. No. 15/470,715, filed Mar. 27, 2017.
CTFR, mailed on Jan. 25, 2018, re: Siying Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, dated Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, dated May 18, 2018, re: Siying Yang, U.S. Appl. No. 14/942,769, filed Jun. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
International Search Report, dated Feb. 16, 2017, PCT/US16/53472.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
CTNF, mailed on Feb. 1, 2018, re: Nwokedi Idika, U.S. Appl. No. 15/204,710, filed Jul. 7, 2016.
NOA, dated Aug. 13, 2018, re: Daniel G. Moen, U.S. Appl. No. 14/980,231, filed Dec. 28, 2015.
NOA, dated Sep. 5, 2018, re: Daniel G. Moen, U.S. Appl. No. 14/980,231, filed Dec. 28, 2015.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
NOA, dated Feb. 7, 2019, re: Siying Yang, U.S. Appl. No. 16/190,015, filed Nov. 13, 2018.
CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.
CTFR, mailed on Nov. 30, 2018, re: Siying Yang, U.S. Appl. No. 14/925,547, filed Oct. 28, 2015.
NOA, dated Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, dated Sep. 12, 2018, re: Justin D. Call, U.S. Appl. No. 15/645,787, filed Jul. 10, 2017.
CTNF, mailed on Nov. 29, 2018, re: Jarrod S. Overson, U.S. Appl. No. 15/059,080, filed Mar. 2, 2016.
NOA, dated Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
NOA, dated Feb. 6, 2019, re: Eli Mattson, U.S. Appl. No. 15/430,224, filed Feb. 10, 2017.
NOA, dated Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, dated Mar. 11, 2019, re: Zhiwei Li, U.S. Appl. No. 15/968,573, filed May 1, 2018.

(56) References Cited

OTHER PUBLICATIONS

CTNF, mailed on May 15, 2019, re: Michael J. Ficarra, U.S. Appl. No. 15/060,380, filed Mar. 3, 2016.
U.S. Appl. No. 16/190,015, filed Mar. 14, 2019, Sying Yang.
Rieck et al., "Cujo: Efficient Detection and Prevention of Drive-by-Download Attacks", ACSAC, dated 2010, Austin Texas, 9 pages.
CodeSealer, "CodeSealer," codesealer.com [online] 2013 [captured Aug. 29, 2013]., web.archive.org/web/20130829165031/http://codesealer.com/ technology.html>, 2 pages.
Cova et al., "Detection and Analysis of Drive-by-Download Attacks and Malicious JavaScript Code", World Wide Web Conference Committee, Apr. 26-30, 2010, 10 pages.
Egele et al., "Defending Browsers against Drive-by Downloads: Mitigating Heapspraying Code Injection Attacks," Detection of Intrusions and Malware, and Vulnerability Assess.Lecture Notes, 2009, 19pgs.
Entrust, "Defeating Man-in-the-Browser Malware," Entrust.com [online] Sep. 2012 [retrieved Oct. 15, 2013], http://download.entrust.com/resources/download.cfm/24002/>, 18 pages.
Hofmeyr et al., "Intrusion Detection Using Sequences of Systems", Journal of Computer Security 6, dated Aug. 8, 1998, 30 pages.
International Searching Authority, "Search Report" in application No. PCT/US2014/024232, dated Aug. 1, 2014, 52 pages.
Marcus and Sherstobitoff, "Dissecting Operation High Roller," McAfee [online] 2012 [retrieved on Oct. 15, 2013]. http://www.mcafee.com/us/resources/reports/rpoperation-high-roller.pdf>, 20 pages.
Anderson et al., "Measuring the Cost of Cybercrime," 2012 Workshop on the Economics of Information Security (WEIS), [retrieved on Oct. 15, 2013], 31 pages.
Pattabiraman et al., "DoDOM: Leveraging DOM Invariants for Web 2.0 Application Robustness Testing",dated 2010, IEEE 21st International Symposium on Software Reliability Engineering, 10 pages.
Vasco, "Hardened Browser," vasco.com [online] [retrieved on Oct. 15, 2013]. Retrieved from the Internet: <URL:http://www.vasco.com/products/client_products/pki_digipass/hardened_browser.aspx>, 2 pages.
RSA, "RSA Offers Advanced Solutions to Help Combat Man-In-The-Browser Attacks," rsa.com [online] May 18, 2010 [captured Nov. 11, 2011]., 3 pages.
Rutkowska, "Rootkits vs. Stealth by Design Malware," Black Hat Europe, 2006. Retrieved from the Internet:<URL:http://www.blackhat.com/presentations/bheurope-06/bh-eu-06-Rutkowska.pdf> 44 pages.
SafeNet, "Prevent Financial Fraud and Man-in-the-Browser Attacks," safenet-inc.com [online] [retrieved on Oct. 15, 2013], 5 pages.
Sood and Enbody, "A Browser Malware Taxonomy," Virus Bulletin, Jun. 2011. Retrieved from the Internet:<URL:http://www.secniche.org/released/VB_BRW_MAL_TAX_AKS_RJE.pdf>, 5 pages.
Sood and Enbody, "Browser Exploit Packs—Exploitation Tactics," Virus Bulletin Conference, Oct. 2011, http://www.secniche.org/papers/VB_2011_BRW_EXP_PACKS_AKS_RJE.pdf>, 9 pages.
Sood et al., "The Art of Stealing Banking Information—Form grabbing on Fire," Virus Bulletin, Nov. 2011, virusbtn.com/virusbulletin/archive/2011/11/vb201111-formgrabbing>, (pp. 19-23 of 24 pages).
Team Cymru, "Cybercrime—an Epidemic," Queue, 4(9):24-35, Nov. 2006, http://trygstad.rice.iit.edu:8000/Articles/Cybercrime%20-%20An%20Epidemic%20-%20ACM%20Queue.pdf>, 3 pages.
Trusteer, "Trusteer Rapport", "Endpoint-centric Fraud Prevention", from the web http://www.trusteer.com/products/trusteer-rapport, last accessed on Jan. 9, 2013, 2 pages.
Oh, "Recent Java exploitation trends and malware," Black Hat USA 2012, :https://media.blackhat.com/bh-us-12/Briefings/OH/BH_US_12_Oh_Recent_Java_Exploitation_Trends_and_Malware_WP.pdf>, 27 pages.
NOA, dated Jun. 3, 2019, re: Siying Yang, U.S. Appl. No. 16/190,015, filed Nov. 13, 2018.
CTFR, dated Jul. 1, 2019, re: Nwokedi Idika , U.S. Appl. No. 14/728,596, filed Jun. 2, 2015.
CTNF, dated Sep. 4, 2019, re: Timothy Dylan Peacock, U.S. Appl. No. 15/137,824, filed Apr. 25, 2016.
CTNF, dated Aug. 14, 2019, re: Nwokedi Idika, U.S. Appl. No. 16/236,520, filed Dec. 30, 2018.
CTNF, dated Sep. 4, 2019, re: Justin D. Call, U.S. Appl. No. 16/234,848, filed Dec. 28, 2018.
CTNF, dated Sep. 4, 2019, re: Bei Zhang, U.S. Appl. No. 16/413,451, filed May 15, 2019.
NOA, dated Oct. 3, 2019, re: Marc R. Hansen, U.S. Appl. No. 15/202,755, filed Jul. 6, 2016.
CTNF, dated Sep. 24, 2019, re: Ganesh Jampani, U.S. Appl. No. 16/259,890, filed Jan. 28, 2019.
U.S. Appl. No. 16/457,589, filed Oct. 24, 2019, Zhiwei Li.
NOA, dated Dec. 3, 2019, re: Nwokedi Idika, U.S. Appl. No. 16/236,520, filed Dec. 30, 2018.
CTNF, dated Dec. 11, 2019, re: Siying Yang, U.S. Appl. No. 16/236,519, filed Dec. 30, 2018.
NOA, dated Dec. 11, 2019, re: Jarrod S. Overson, U.S. Appl. No. 15/059,080, filed Mar. 2, 2016.

\* cited by examiner

DETERMINISTIC REPRODUCTION OF SYSTEM STATE USING SEEDED PSEUDO-RANDOM NUMBER GENERATORS

FIELD OF THE DISCLOSURE

The present disclosure generally relates to security techniques applicable to client/server systems, and relates more specifically to techniques for reducing the amount memory or storage used by a client computer or an intermediary, and the bandwidth used between the client computer and the intermediary interacting with the server computer on behalf of a server computer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer applications that may request and execute instructions received from a web server to generate and present complex user interfaces to a user through one or more devices, such as a monitor or speakers. In response to input from a user, such as a mouse click indicating that the user selected an object defined in the instructions, such as a link, a browser may send a request based on the selected object to the web server. The request may be a request for data or include data for the web server to process.

Attackers may use software, often referred to as a "bot", which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 2:
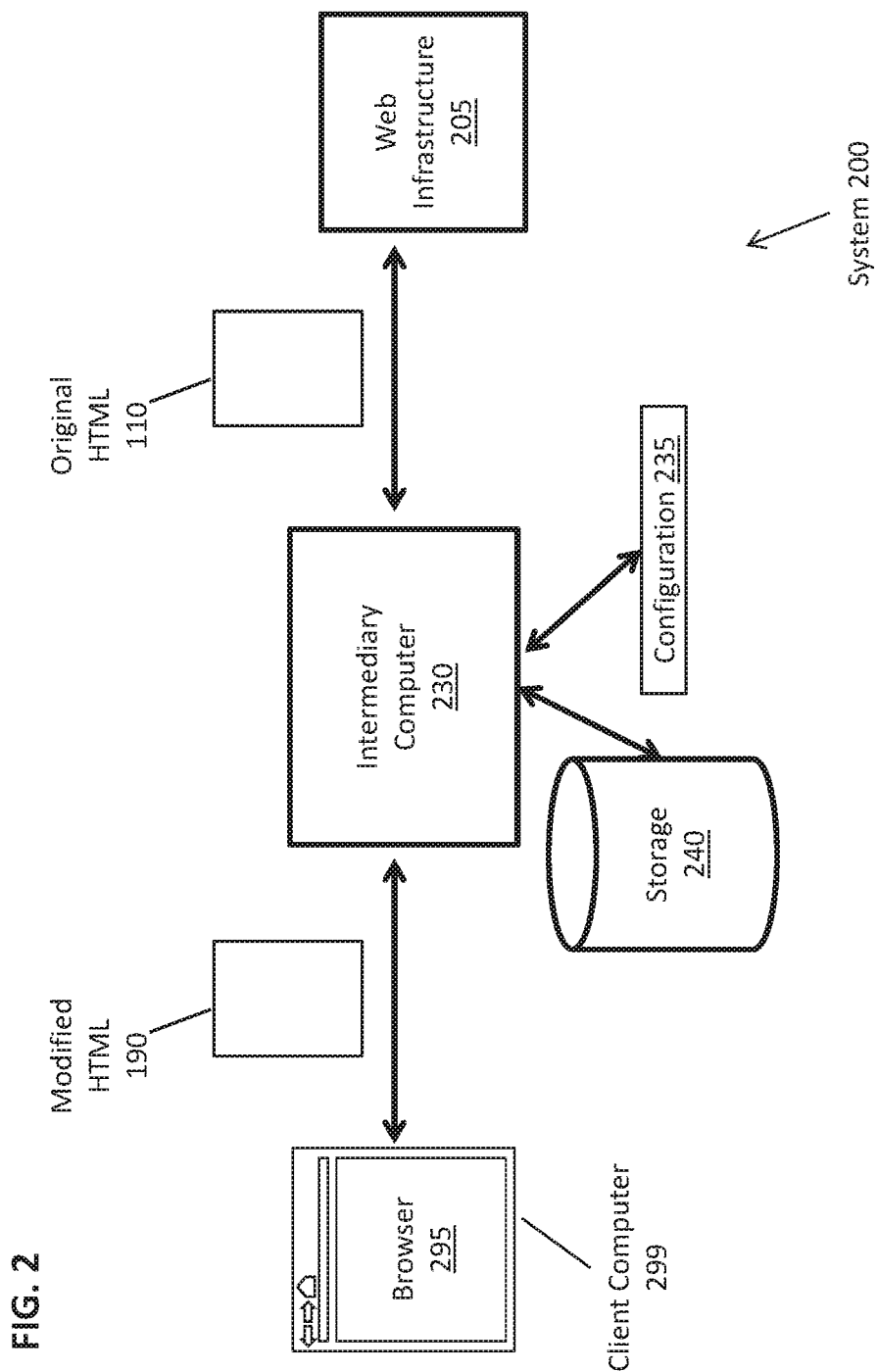
FIG. 2 illustrates a computer system comprising a browser, a web infrastructure, and an intermediary computer, which may be configured to implement one or more deterministic polymorphic protocols, in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and steps in FIG. 4 and discussed in detail below, but using the particular arrangement illustrated in FIG. 2 is not required in other embodiments. Furthermore, while the instructions discussed in many example embodiments are HyperText Markup Language ("HTML") and JavaScript instructions, in other embodiments, the instructions intercepted and generated may be any other standard or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise.

Embodiments are described herein according to the following outline:

1.0 General Overview
2.0 Browsers, Bots, and Attacks
   2.1 Search Page Example
3.0 Polymorphic Protocols
   3.1 Search Page Example Continued
   3.2 Modified Search Page Example using Embedded, Encrypted Data Structures
   3.3 Deterministic Polymorphism
   3.4 The Nonce
   3.5 Anatomy of a Web Page Generated with a Deterministic Polymorphic Protocol 4.0 Example Network Topology that Implements one or more Polymorphic Protocols
   4.1 Web Infrastructure
   4.2 Intermediary Computer
      4.2.1 Protocol Client Logic
      4.2.2 Processing Logic
      4.2.3 Forward Polymorphic Logic
      4.2.4 Protocol Server Logic
      4.2.5 Validation Logic
      4.2.6 Reverse Polymorphic Logic
      4.2.7 Configurations
      4.2.8 Storage
   4.3 Browser
5.0 Process Overview
   5.1 Intercepting Instructions from a Server Computer
   5.2 Modifying Object or Values Using a Deterministic Polymorphic Protocol
   5.3 Generating a Modified HTML File Using a Deterministic Polymorphic Protocol
   5.4 Validating a Request based on a Deterministic Polymorphic Protocol
      5.4.1 Validating Requests based on one or more Parameters
   5.5 Generating a New Request based on one or more Original Identifiers or Values
   5.6 Performing a Negative Action
6.0 Implementation Mechanisms—Hardware Overview
7.0 Other Aspects of Disclosure

1.0 GENERAL OVERVIEW

In an embodiment, a computer system comprises a memory; one or more processors coupled to the memory and configured to: generate a first modified identifier for a first original object based on a first original identifier and a first nonce; render one or more first instructions that include the first nonce and define a first modified object that corresponds to the first original object and includes the first modified identifier; send the one or more first instructions to a client computer, wherein the one or more first instructions, when executed by the client computer, are configured to cause the client computer to send a request from the client computer with the first modified identifier and the first nonce; receive, from the client computer, a first request with a first challenge identifier and a first challenge nonce; generate a first test identifier based on the first original identifier and the first challenge nonce; determine whether the first test identifier matches the first challenge identifier.

In an embodiment, the one or more processors are further configured to, prior to generating the first modified identifier, receive a set of one or more instructions that define the first original object with the first original identifier, which are configured to cause one or more requests to be sent to a server computer when executed by a client computer.

In an embodiment, a computer system comprises a memory; one or more processors coupled to the memory and configured to: receive one or more first instructions that define one or more first original objects that correspond to one or more first original values, respectively, wherein the one or more first instructions are configured to cause one or more requests with the one or more first original values to be sent to a server computer if executed by a client computer; generate one or more modified first values that correspond to the one or more first original values, respectively, wherein each modified value of the one or more modified first values is generated based a first nonce and a value from the one or more first original values that corresponds with the modified value; render one or more second instructions that define the first nonce and one or more first modified objects that correspond to the one or more first original objects, respectively, wherein each modified object of the one or more first modified objects includes a modified value from the one or more modified first values, respectively, wherein the one or more second instructions are configured to cause the client computer to send a request from the client computer with the one or more modified first values and the first nonce; receive, from the client computer, a first request that includes one or more first challenge values and a first challenge nonce; generate one or more first test values based on the one or more first original values, respectively, and the first challenge nonce; determine whether each test value of the one or more first test values matches each challenge value of the one or more first challenge values, respectively; in response to determining that each test value of the one or more first test values matches each challenge value of the one or more first challenge values, respectively, replace the one or more first challenge values in the first request with the one or more first original values, respectively, to produce a second request and send the second request to the server computer.

Embodiments discussed herein provide numerous benefits and improvements over the general idea of increasing the resistance of browsers and server computers to computer attacks. For example, to protect data stored in objects in a web page, or to filter requests that include data entered into objects in the web page, a server computer may modify the object identifiers dynamically so that each time the server computer serves an instance of the web page to a browser the objects in the instance have different identifiers. Accordingly, bots cannot determine which modified objects are the objects that the bot was looking for. However, when a browser generates a request based on an instance of a web page with modified object identifiers, the request may include the modified object identifiers rather than the original object identifiers. To translate the modified object identifiers in a request back into the original object identifiers, the server computer may maintain a repository of mappings between the modified object identifiers and the original identifiers for each instance of the web page served to each client computer. For many web sites, the repository would be too large to be a feasible solution. One or more of the embodiments discussed herein may reduce the amount of memory or storage used by the server computer because neither the client computer nor the server computer must store mappings between modified object identifiers and original object identifiers.

Additionally or alternatively, in each instance of the web page, the server computer may embed the mappings between the modified object identifiers and the original object identifiers along with instructions that cause a browser to send the mappings back to the server computer with a subsequent request based on the instance of the web page. Sending the mappings back and forth increases the bandwidth required for the server computer. Furthermore, embedding the mappings in an instance of the web page is a security threat. To reduce the security threat, for each instance of the web page, the server computer may encrypt the mappings and embed the encrypted mappings into the web page. When the server computer receives a request with the encrypted mappings, then the server computer may decrypt the mappings, and then translate the modified object identifiers in the request back into the original object identifiers. Embedding the mappings may increase the size of each instance of the web page and the data included in the subsequent request(s). Encrypting and decrypting the mappings will take additional computing resources. One or more of the embodiments discussed herein may reduce the amount of bandwidth, or the computational resources, required by the server computer because the client computer and the server computer need not send mappings between modified object identifiers and original object identifiers to each other.

2.0 BROWSERS, BOTS, AND ATTACKS

A web browser may be a tool through which server-based application programs can provide client computers with content in a dynamic, custom UI. For example, in response to receiving a request for data from a web browser, a web server may respond with a set of instructions that define one or more objects with one or more object identifiers. The instructions may use the object identifiers to define how particular objects may be presented in a UI to enable human/computer interaction. Additionally or alternatively, the instructions may use object identifiers to store data into, or retrieve data from, particular objects. An object may be one or more data structures with one or more values, such as a key-value pair, an array of values, a linked list, a tree structure, or a single value. For example, an object may include three key-value pairs: a first key-value pair specifying an identifier for the object, a second key-value pair indicating that text in the object should be display with a green hue, and a third key-value pair indicating the input object should be presented according to one or more visual attributes. An object may include one or more other objects.

For convenience of expression, a set of instructions may be referred to herein as a file or web page. A set of instructions, file, or web page need not have a particular type or extension, and need not be stored in persistent storage. For example, a web page may be generated dynamically based on one or more parameters. While some files may be identified as a particular type of file, such as an "HTML file" or "JavaScript file", a file may include mixed content. For example, an HTML file may include HTML, JavaScript, Cascading Style Sheets ("CSS"), or any other standard or proprietary set of instructions. Furthermore, a file need not be a file stored in persistent storage.

In contrast, bots traverse web pages or web sites to retrieve data from, or submit data to, one or more web servers with little, if any, human/computer interaction. For example, in response to receiving a request for data from a bot, a web server may respond with a set of instructions. A bot may parse the instructions to collect data from, or to store data in, particular objects with particular object identifiers. A bot may also make requests based on an object identifier, such as the identifier for a text field input.

2.1 Search Page Example

As discussed herein an attacker may configure a bot to use object identifiers in various attacks. In contrast, a browser may use one or more objects in a web page to request data from, or submit data to, a web server computer. For purposes of illustrating a clear example, assume the following:

A social networking website has a user search page that defines two objects: an input field with "search" as an identifier, and a button with "submit" as an identifier;

A browser downloads the user search page;

The browser receives input indicating a user has entered the name of a target user in the input field and selected the submit button.

In response to the input indicating the user selected the submit button, the browser may send a request to the social networking web site with a key-value pair with the object identifier for the input field ("search") as the key and the text entered into the input field as the value. The social networking web site queries for a target user using the data that identifies the target user, which is associated with the "search" key. In response, the social networking web site sends results from the search, such as personal data about the target user, back to the browser. For convenience of expression, a web site performing an action, such as receiving a request or performing a query, may mean one or more computers that the web site comprises performing the action.

A bot may exploit the user search page to download personally identifying data of millions of users on the social networking web site. For example, a bot may send millions of requests for different target users. Each request of the millions of requests may imitate a request generated by a legitimate user using a web browser by including a key-value pair in the request with the name of the input field as the key ("search") and data that identifies a target user as the value. In response, the bot may receive the personally identifying data for each target user from the social networking web site.

3.0 POLYMORPHIC PROTOCOLS

One or more polymorphic protocols may be used to prevent or deter attacks. A polymorphic protocol may be a function, configuration, or policy that identifies one or more objects, in one or more web pages, that should be modified. Additionally or alternatively, a polymorphic protocol may indicate how the one or more objects in the one or more web pages should be modified. For example, a polymorphic protocol may indicate that one or more objects in a particular web page should be modified to include one or more new object identifiers each time the particular web page is requested A polymorphic protocol may identify which one or more objects should be modified based on one or more factors. For example, a polymorphic protocol may indicate that each object should be modified that is a particular type of object, includes a particular object identifier or other property, is included in a particular parent object, or is the parent of a particular object. Additionally or alternatively, a polymorphic protocol may identify objects or objects within particular web pages based on other factors, such as the Uniform Resource Locator ("URL") associated with a web page or in a request, one or more parameters in the request, the domain name included in the URL, the protocol over which a request is made, the user or the client computer requesting the web page, the protocol used to send or receive the request, or any other data associated with a web page, user, client computer, server computer, underlying network protocol, or network topology.

Modifying one or more object identifiers in the instructions sent from a server computer to a browser may prevent, or reduce the effectiveness of bots or one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities. For example, bots that rely on one or more particular object identifiers to find a particular set of data in a web page may not find the data because the object identifiers change each time the web page is rendered or sent to a client computer.

A polymorphic protocol may define one or more new objects to add to one or more web pages. For example, a polymorphic protocol may indicate that, for a particular web page, one or more instructions should be added to the particular web page, which instructions define a new object that includes an expiration time. If a server computer receives a request that includes the expiration time and the current time is past the expiration time, then the server computer may ignore the request or perform one or more other negative responses; otherwise, the server computer may process the request.

3.1 Search Page Example Continued

Continuing with the search page example, to prevent a bot from using the search page to gather users' personally identifying information, a server computer may change the identifier of the search field from "search" to a new identifier each time the search page is requested according to a polymorphic protocol. For example, each time the social networking web site generates the search page, the social networking web site may change the identifier of the search field to a new identifier according to a polymorphic protocol. To validate a subsequent search request, the social networking web site may store the new identifier in a database and associate the new identifier with the original search field identifier ("search"). In response to receiving a search request that includes a particular identifier of the search field, the social networking web site may query the database for the particular identifier. If the social networking web site finds the particular identifier, then the social networking web site may replace the particular identifier with the search field identifier and process the request with the original search field identifier. For example, the social networking web site may execute the search query, return the results to the client computer, and delete the particular identifier from the database so that a bot cannot continue to use the particular identifier.

For a single field, on a single web page, for a small number of users, the database may be small. However, for a web site with many web pages, each of which is requested many times and has one or more objects that are added or changed each time the web page is generated, the database can grow too large, and be too costly, for the former countermeasure to be feasible.

3.2 Modified Search Page Example Using Embedded, Encrypted Data Structures

One way to reduce the size of the database is to generate an encrypted data structure for each instance of a web page that the web site generates. The encrypted data structure may associate each modified object identifier with the original object identifier. Additionally or alternatively, the encrypted data structure may include other data for validating a subsequent request. The web site may include the encrypted data structure in the instance of the web page. The web site may also include instructions in the instance of the web page that causes a legitimate browser to include the encrypted data structure in subsequent requests.

Returning to the search page example, each time the social networking web site generates a new instance of the search page, the social networking web site may embed an encrypted data structure in the new instance of the search page that associates the new identifier with the original search field identifier. The social networking web site may include one or more instructions in the new instance of the search page that causes a legitimate browser to include the encrypted data structure in a subsequent user search request. The web site may include one or more additional values in the encrypted data structure, such as a time at which the new identifier is no longer valid. Accordingly, in response to receiving a search request that includes a particular identifier and an encrypted data structure, the social networking web site may decrypt the data structure. If the particular identifier matches the new identifier associated with the original identifier of the search field in the encrypted data structure, then the social networking web site may determine the request is valid; otherwise, the social networking web site may determine the request is not valid. In response to determining the request is valid, the social networking web site may replace the particular identifier with the original search field identifier and process the request with the original search field identifier. The social networking web site may execute the search query and return the results to the client computer.

In the example above, each request sent from a client includes an encrypted data structure. The encrypted data structure may include many associations between original identifiers and new identifiers, as well as additional data, such as expiration times, etc. The encrypted data structure may include data and associations between original identifiers and new identifiers that the web site does not use for a particular request. For example, a browser may generate a request in response to a user selecting a link in a particular instance of a search page. The request may include an encrypted data structure that comprises data that the web site may use to validate the request based on the selected link. However, the encrypted data structure may include additional data that is not relevant to the selected link, such as the original identifier of the search field in the search page and the corresponding new identifier for the particular instance of the search page.

Encrypting and decrypting data structures is computationally time consuming and may add a substantial load to a web site's server computers. Furthermore, the amount of data in a data structure may increase as a web page grows in complexity, number of objects, and features, which requires additional time or computing power to encrypt and decrypt data that may or may not be useful in a request. Further still, sending and receiving encrypted data structures may substantially reduce the available bandwidth of the web site.

3.3 Deterministic Polymorphism

A web site may use deterministic polymorphism to modify one or more values and validate requests based on the one or more modified values, without an encrypted data structure that includes one or more mappings from original values to modified values. A deterministic polymorphic protocol may take an original value (such as an object identifier) and one or more additional parameters as input and generate an output value (such as a modified object identifier). The same deterministic polymorphic protocol may produce the same output for the same inputs. However, a different output may be produced if the deterministic polymorphic protocol, or one or more of the inputs, are different. For example, a deterministic polymorphic protocol may comprise a pseudo-random number generator ("PRNG"), and may take an original object identifier and a nonce as input and generate a modified identifier. Also for example, a deterministic polymorphic protocol may comprise a deterministic cryptographic function, and may take an original object identifier and a nonce as input and generate a modified identifier. The deterministic polymorphic protocol will generate the same modified identifier each time the same original object identifier and the same nonce are used as input.

A computer, such as the web server computer or an intermediary computer may validate a modified identifier, or a request with a modified identifier, based on a deterministic polymorphic protocol without storing or transferring a data structure (encrypted or not encrypted) that includes the original identifier(s), the modified identifier(s), and data associating the original identifier(s) to the modified identifier(s). For purposes of illustrating a clear example, assume the following:

A computer, using a deterministic polymorphic protocol, generates a modified value J based on an original value K and a nonce L;

The computer receives a first request with a challenge value J' and a challenge nonce L';

L' is the same as L.

In response to receiving the first request, the computer, using the same deterministic polymorphic protocol, may generate test value J" based on original value K and challenge nonce L'. Since challenge nonce L' is the same as nonce L, then test value J" will be the same as both modified value J and challenge value J'. Accordingly, if test value J" is same as challenge value J', then challenge value J' or the request with challenge value J' and nonce L' is validated.

In contrast, and for purposes of illustrating a clear example of invalidating a modified value or request with a modified value based on a deterministic polymorphic protocol, assume the following:

The computer, using the same deterministic polymorphic protocol in the previous example, generates a modified value X based on an original value Y and a nonce Z;

The computer receives a second request with a challenge value X' and a challenge nonce Z'.

Z' is not the same as Z.

In response to receiving the second request, the computer, using the same deterministic polymorphic protocol, may generate test value X" based on original value Y and challenge nonce Z'. Since challenge nonce Z' is not the same as nonce Z, then test value X" will not be the same as either modified value X or challenge value X'. Accordingly, if test value X" is not the same as challenge value X', then challenge value X' or the request with challenge value X' and nonce Z' is invalidated.

3.4 The Nonce

The nonce can be a value generated or defined by a user, a computer, or a polymorphic protocol. For example, a nonce may be a number generated by a PRNG with a uniform distribution and seeded based on a current time since an epoch. A value may be data, such as text, numbers, or non-printable characters.

3.5 Anatomy of a Web Page Generated with a Deterministic Polymorphic Protocol

Figure 1:
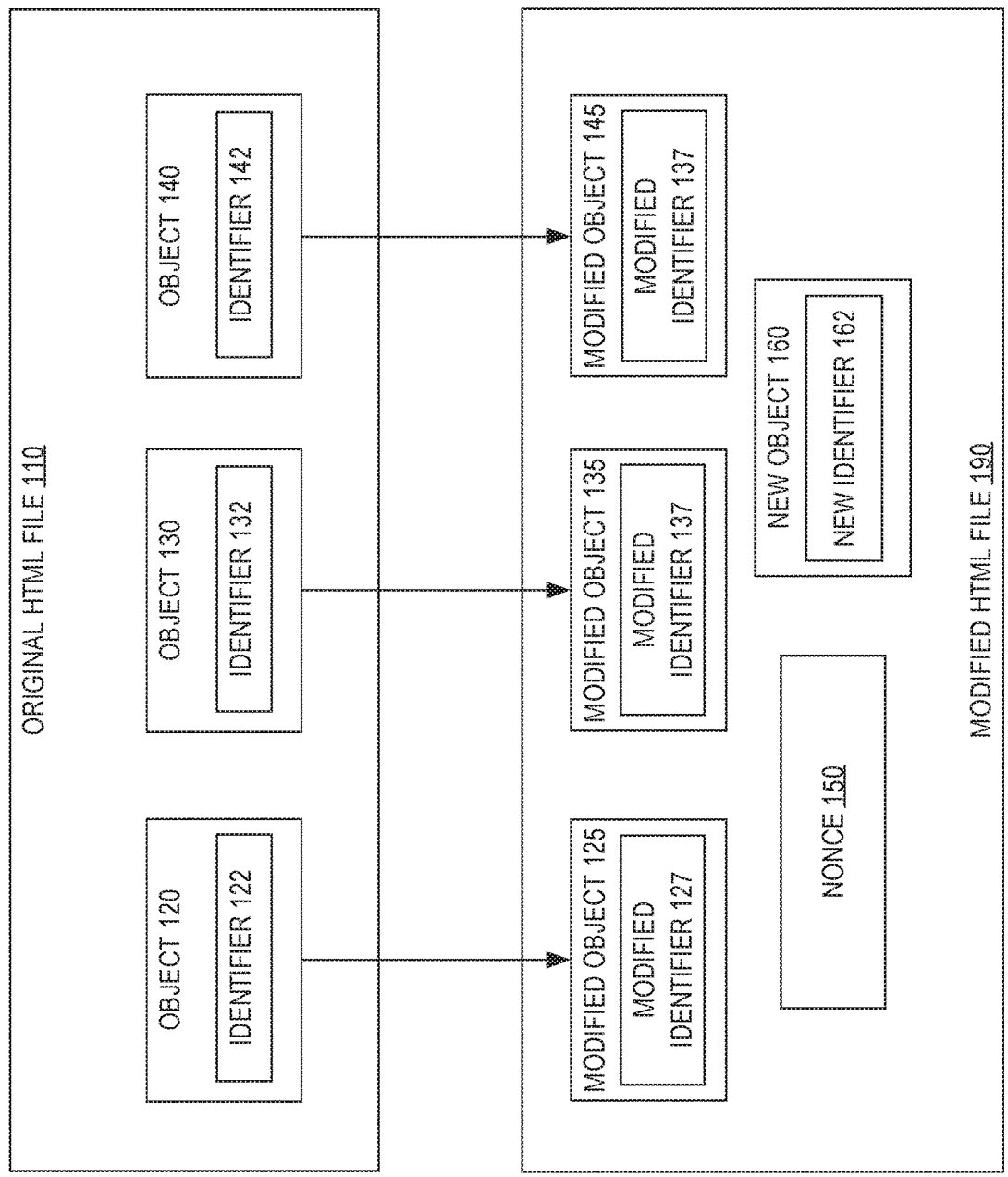
FIG. 1 illustrates a modified HTML file generated from an original HTML document based on a deterministic polymorphic protocol in an example embodiment.

FIG. 1 illustrates a modified HTML file generated from an original HTML document based on a deterministic polymorphic protocol in an example embodiment. In FIG. 1, original HTML file 110 comprises instructions that may be stored on, or generated by, a web server computer. Original HTML file 110 defines original object 120, original object 130, and original object 140, which include the following identifiers, respectively: original identifier 122, original identifier 132, and original identifier 142. Each object in original HTML file 110 may comprise one or more other objects.

A computer, using a deterministic polymorphic protocol, may generate modified HTML file 190 from original HTML file 110. Modified HTML file 190 defines modified object 125, modified object 135, and modified object 145, which correspond to original object 120, original object 130, and original object 140, respectively. Each modified object includes a modified identifier that the computer generated based on a nonce and the identifier from the corresponding original object in original HTML file 110. For example, modified identifier 127 is based on original identifier 122 and nonce 150, modified identifier 137 is based on original identifier 132 and nonce 150, and modified identifier 147 is based on original identifier 142 and nonce 150.

The computer may add the nonce 150 to modified HTML file 190 along with one or more instructions, which when executed, cause a client computer to send nonce 150 in one or more requests to the server computer to validate the one or more requests. For example, a server computer may add one or more instructions to modified HTML file 190, which when executed to by a client computer, cause the client computer to store nonce 150 in a cookie. The client computer may submit the cookie each time the client computer sends a request to the server computer. Additionally or alternatively, the server computer may add one or more instructions that add a hidden field with nonce 150 in one or more forms. Additionally or alternatively, the server computer may modify one or more links to include nonce 150. Additionally or alternatively, the server computer may add one or more instructions that define a callback handler and that cause a client computer to execute the callback handler before the client computer sends a request; the callback handler may be configured to add nonce 150 to each request from the client computer.

The computer may add other new objects to modified HTML file 190. For example, the computer may add new object 160 to modified HTML file 190. New object 160 includes new identifier 162 and may include data for validating one or more requests. For example, new identifier 162 may be a key called "nonce-expiration-time" and a value indicating a time at which nonce 150 is no longer valid. The server computer may encrypt one or more objects that are added for security, such as new object 160. The server computer may encrypt the one or more objects using the same nonce, which in this example is nonce 150, or a different nonce.

In original HTML file 110, original object 120, original object 130, and original object 140 are illustrated as if separate, unrelated objects. Similarly, in modified HTML file 190, modified object 125, modified object 135, and modified object 145 are illustrated as if separate, unrelated objects. However, each original object may be related to one or more other objects. For example, original object 120 may be a child of an object not illustrated in the original HTML file 110, and a parent object to original object 130, original object 140, or one or more other objects not illustrated in FIG. 1. Similarly, each modified object may be related to one or more objects. For example, modified object 125 may be a child of an object not illustrate in modified HTML file 190, and a parent object to modified object 135, new object 160, or one or more original child objects not illustrated in modified HTML file 190.

For purposes of illustrating a clear example, In FIG. 1, original HTML file 110 and modified HTML file 190 are each illustrated as a single file with HTML that defines each original object, modified object, new object, or nonce. However, original HTML file 110 and modified HTML file 190 may each comprise one or more files. Each file may include a single structured data format or set of executable instructions; additionally or alternatively, each file may be a mixed content file that includes instructions that define objects or functionality in HTML, JavaScript, or one or more other structured data formats or executable instructions.

4.0 EXAMPLE NETWORK TOPOLOGY THAT IMPLEMENTS ONE OR MORE POLYMORPHIC PROTOCOLS

FIG. 2 illustrates a computer system comprising a browser, a web infrastructure, and an intermediary computer, which may be configured to implement one or more deterministic polymorphic protocols, in an example embodiment. In FIG. 2, system 200 comprises web infrastructure 205, client computer 299, intermediary computer 230, storage 240, and configuration 235 distributed across one or more interconnected networks.

While each of the components listed above is illustrated as if running on a separate, remote computer from each other, one or more of the components listed above may be part of or executed on the same computer. For example, intermediary computer 230, configuration 235, storage 240, or web infrastructure 205 may be executed on the same computer, local area, or wide area network. Additionally or alternatively, intermediary computer 230 may be a proxy server or layer for web infrastructure 205. Additionally or alternatively, intermediary computer 230 may be in line between a router and web infrastructure 205, such that intermediary computer 230 may intercept all network data sent to, or sent from, web infrastructure 205 over one or more protocols. Additionally or alternatively, intermediary computer 230, or one or more modules or logic comprising intermediary computer 230 discussed herein, may be a software layer between, or executed on, web infrastructure 205 or a component of web infrastructure 205. Additionally or alternatively, intermediary computer 230, or one or more modules or logic comprising intermediary computer 230 discussed herein, may be part of a server-side application that responds to requests over one or more standard or proprietary protocols, such as Hypertext Transfer Protocol ("HTTP") or any other protocol.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

4.1 Web Infrastructure

Web infrastructure 205 may comprise one or more server computers that receive requests for data from users through one or more client computers, such as client computer 299 or intermediary computer 230. Web infrastructure 205 may respond by sending data to the browser that sent the request. As illustrated in FIG. 2, the data sent from web infrastructure 205 may include one or more types of instructions, such as HTML, JavaScript, CSS, or any other standard or propriety instructions. The one or more computers in web infrastructure 205 may, but need not, be owned or managed by one or more independent entities and may span across one or more computer networks, such as the Internet.

A server computer may be a computer that receives requests for data and responds with data. For example, a web server computer may be an HTTP-based computer that receives HTTP requests and responds with data comprising HTML or JavaScript instructions. Additionally or alternatively, a server computer may respond with data that references data on other server computers in, or outside of, web infrastructure 205.

4.2 Intermediary Computer

Intermediary computer 230 may be an intermediary that may intercept instructions sent from web infrastructure 205, parse or execute one or more of the intercepted instructions, modify the intercepted instructions, generate or add new instructions, and send the modified or new instructions to a client computer. For example, intermediary computer 230 may intercept original HTML file 110, generate modified HTML file 190, and send modified HTML file 190 to browser 295. Intermediary computer 230 may intercept a request from browser 295, generate a new or modified request, and send the new or modified request to web infrastructure 205.

Intermediary computer 230 may be an HTTP or SPDY intermediary that intercepts, parses, executes, or processes HTML, JavaScript, and CSS instructions. Additionally or alternatively, intermediary computer 230 may intercept requests for data or instructions from a client application, generate a new HTTP request, and send the newly generated HTTP request to one or more HTTP or SPDY-based web servers. Additionally or alternatively, intermediary computer 230 may be an intermediary for any other standard or proprietary protocol. Each of the components discussed herein, which intermediary computer 230 is comprised of, may be configured to perform any of the processes or methods discussed herein for any standard or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as original web server computer 302.

In FIG. 2, intermediary computer 230 is programmed to send instructions to, and receive requests from, a particular type of client application: browser 295. However, in an embodiment, intermediary computer 230 may be programmed to send instructions to, receive requests from, or open sockets with browsers or bots.

Figure 3:
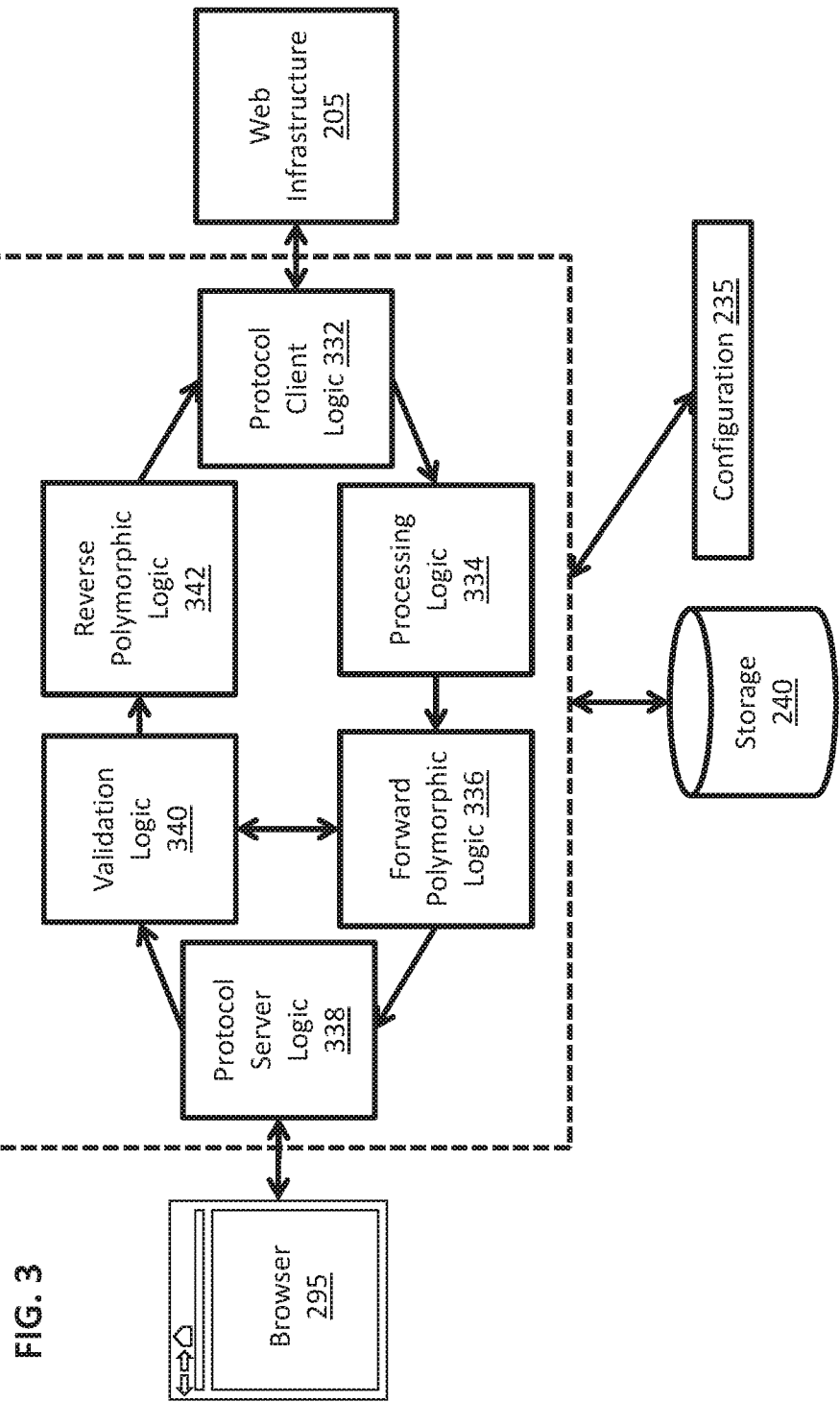
FIG. 3 illustrates detailed view of an intermediary computer in an example embodiment.

FIG. 3 illustrates detailed view of an intermediary computer in an example embodiment. In FIG. 3, intermediary computer 230 comprises protocol client logic 332, processing logic 334, forward polymorphic logic 336, protocol server logic 338, validation logic 340, and reverse polymorphic logic 342. In an embodiment, each of the logical or functional units of intermediary computer 230 may be implemented using any of the techniques further described herein in connection with FIG. 5. For example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices or modules being communicatively coupled, each of the computers, devices, modules, storage, and configurations may be communicatively coupled with each other.

4.2.1 Protocol Client Logic

Protocol client logic 332 may intercept data over any standard or proprietary protocol. For example, protocol client logic 332 may intercept data over HTTP.

4.2.2 PROCESSING LOGIC

Processing logic 334 may process instructions intercepted by protocol client logic 332, which causes processing logic 334 to generate one or more in-memory data structures that correspond to one or more objects. Processing one or more instructions may comprise parsing or executing the one or more instructions. After processing the instructions, processing logic 334 may notify forward polymorphic logic 336 to begin rendering instructions based on the one or more data structures.

Processing logic 334 may make requests for additional data. For example, if instructions received from protocol client logic 332 reference one or more instruction files, then processing logic 334 may request the one or more instruction files through protocol client logic 332.

4.2.3 Forward Polymorphic Logic

Forward polymorphic logic 336 may modify one or more original object identifiers to produce one or more modified object identifiers based on one or more configurations or polymorphic protocols in configuration 235. Forward polymorphic logic 336 may generate one or more nonce values ("nonces") and the one or more new object identifiers based on one or more configurations or polymorphic protocols in configuration 235. Forward polymorphic logic 336 need not store mappings between one or more original object identifiers and one or more new object identifiers in storage 240. Forward polymorphic logic 336 may store one or more nonces in storage 240. Forward polymorphic logic 336 may store additional information associate with each nonce in storage 240, such as the time at which the nonce expires or the time after which a request with the nonce is invalid.

Forward polymorphic logic 336 may render a new set of instructions based on the one or more data structures in memory and the new object identifiers. Additionally or alternatively, forward polymorphic logic 336 may generate one or more instructions, which if executed are configured to cause a browser or an execution environment, such as a JavaScript execution environment in a web browser, to return one or more objects, object identifiers, object values, nonces, or other data in one or more requests as discussed herein. Forward polymorphic logic 336 may send the rendered instructions to one or more client computers through protocol server logic 338.

4.2.4 Protocol Server Logic

Protocol server logic 338 may receive the instructions generated by forward polymorphic logic 336 and send the generated instructions to client computer 299. Additionally or alternatively, protocol server logic 338 may intercept requests from client computer 299 and forward the requests to validation logic 340.

4.2.5 Validation Logic

Validation logic 340 may receive requests intercepted by protocol server logic 338 from browser 295 to web infrastructure 205. A client computer may send a request to receive data, such as a web page, or to submit data, such as login information. A request may include a URL, HTTP verb, or other data that identifies the type of web page that the request is requesting or the data that the request is submitting. A request may include one or more parameters that include user input or other data included by the browser or client computer, such as a nonce, one or more modified identifiers, or other data.

Validation logic 340 validates the request based on one or more expected parameters as discussed further herein. If validation logic 340 determines that a request is valid, then validation logic 340 may send the request to reverse polymorphic logic 342; otherwise, validation logic 340 may perform a negative action.

Validation logic 340 may retrieve a set of expected parameters, if any, associated with a URL, HTTP verb, or data, from configuration 235. A set of expected parameters may comprise one or more parameters that validation logic 340 should use to validate a request with the URL, HTTP verb, or other data. If a set of expected parameters is empty or there is no set of expected parameters associated with the URL, HTTP verb, or other data in a request, then validation logic 340 may determine that the request need not be validated. Accordingly, validation logic 340 may pass the request to reverse polymorphic logic, or straight through to web infrastructure 205 video protocol client logic 332. Additionally or alternatively, configuration 235 may include data that indicates which requests that validation logic 340 need not validate based on the request's URL, HTTP verb, or other data. If a request includes a URL, HTTP verb, or other data that configuration 235 indicates need not be verified, then validation logic 340 may pass the request to web infrastructure 205 through reverse polymorphic logic 342 or protocol client logic 332.

4.2.6 Reverse Polymorphic Logic

Reverse polymorphic logic 342 may translate requests intercepted by protocol server logic 338 into requests that browser 295 would have generated had browser 295 received the original instructions with the original object identifiers sent from web infrastructure 205. Reverse polymorphic logic 342 may transform requests based on the set of expected parameters retrieved by validation logic 340. Reverse polymorphic logic 342 may send the transformed request to the intended web server computer(s) in web infrastructure 205 through protocol client logic 332.

4.2.7 Configurations

Configuration 235 may be a database, a configuration file, or any other computer or computer component that stores configurations, settings, preferences, or protocols. Configuration 235 may store configurations for one or more web servers or web sites in web infrastructure 205. A user or administrator may modify configuration 235 through one or more computers, such as intermediary computer 230, a computer in web infrastructure 205, or another computer not illustrated in system 200.

Configuration 235 may include data indicating that forward polymorphic logic 336 should use one or more polymorphic protocols to generate one or more new identifiers for one or more particular object identifiers, new objects, or other values, in one or more web pages, for one or more particular web sites, hosted on web infrastructure 205. Configuration 235 may identify a web page by a URL, HTTP verb, or other data in a request. Configuration 235 may identify data that forward polymorphic logic 336 should encrypt. For example, a user may store data in configuration 235 indicating that forward polymorphic logic 336 should do the following to a web page received in response to a request with "/login" in its URL path, and "GET" as the HTTP verb:

Generate a nonce;

Modify a first object identified as "username" in the web page using a particular PRNG deterministic polymorphic protocol with the nonce;

Modify a second object identified as "password" in the web page using the particular PRNG deterministic polymorphic protocol with the nonce;

Generate a third object identified as "expiration-time" in the web page using the particular PRNG deterministic polymorphic protocol with the nonce;

Encrypt the data in the third object based on the nonce.

Configuration 235 may include data associating one or more web pages, URLs, HTTP verbs, or other values or data in a request (also referred to herein as a set identifier) with one or more sets of expected parameters. A user or administrator may define one or more sets of expected parameters for one or more requests through one or more computers, such as intermediary computer 230, a computer in web infrastructure 205, or another computer not illustrated in system 200. A user or administrator may define a particular order of parameters in a set of expected parameters. For example, a user may store a set of two expected parameters associated with a particular URL, HTTP verb, or other data in the request in configuration 235. The user may also store data, or the expected parameters in a data structure, in configuration 235 indicating that a particular parameter of the two expected parameters should be first in the request for validation logic 340 to determine that the request is valid.

Validation logic 340, or one or more other components, may be configured to observe one or more requests and determine which parameter(s), in which order, were included for each URL, HTTP verb, or one or more other values in the request. For example, for each request observed of a plurality of requests, validation logic 340 may store data in configuration 235 indicating that the one or more parameters in the request are the set of expected parameters, and the URL, HTTP verb, or one or more other values in the request (alone or in combination) comprise the set identifier. Furthermore, for each request, validation logic 340 may store data in configuration 235 indicating that the order of the one or more parameters in the request is the expected order of the parameters in the set of expected parameters.

Configuration 235 may include data that indicates processing logic 334 or forward polymorphic logic 336 should not process or modify particular instructions or data, such as a particular web page. For example, configuration 325 may include data indicating that a home page for a web site is optimized for search engine web crawlers, and that processing logic 334 and forward polymorphic logic 336 should not process or modify instructions or content received in response to a request for the home page.

Configuration 235 may indicate that validation logic 340 need not validate one or more requests requesting, or submitting, data. For example, configuration 235 may include data indicating that validation logic 340 need not validate a request based on a particular URL, HTTP verb, or other value included in the request.

4.2.8 Storage

Storage 240 may be a database, a configuration file, or any other system or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may be a data structure stored, at least in part, in shared memory between one or more intermediary computers. Additionally or alternatively, storage 240 may be a data structure stored, at least in part, in volatile or non-volatile memory.

In an embodiment, forward polymorphic logic 336 may store a nonce and data associated with the nonce, such as an expiration time, in storage 240. In response to request with a particular nonce, validation logic 340 may retrieve the nonce and data associated with the nonce to validate the request.

4.3 Browser

Browser 295 may be a browser as described herein and executed on a client computer, such as client computer 299. Additionally or alternatively, browser 295 may be a bot comprising one or more of the components traditionally found in a browser.

5.0 PROCESS OVERVIEW

In an embodiment, a computer receives one or more first instructions that define one or more original objects that include to one or more original identifiers, respectively. The computer, based on a nonce, generates one or more modified identifiers that correspond to the one or more original identifiers, respectively. Each modified object of the one or more modified objects includes a modified identifier from the one or more modified identifiers, respectively. The computer renders and sends one or more second instructions that define data comprising the nonce and the one or more modified objects to client computer. The one or more second instructions, if executed by a legitimate browser, may cause, among other things, a client computer to send a request to the computer with the one or more modified identifiers and the nonce. The computer may validate the request based on one or more modified identifiers and the nonce. If the request is valid, then the computer generates a new request based on the request received from the client computer, and the new request includes the one or more original object identifiers, instead of the one or more modified identifiers, as if the legitimate browser had received the one or more original instructions. Otherwise, the computer may perform a negative action, such as terminate the client's request.

Various embodiments may use standard web protocols, such as HTTP, or standard web-based instructions, such as HTML or JavaScript. Additionally or alternatively, other standard or proprietary protocols or other standard or proprietary instructions may be used.

5.1 Intercepting Instructions from a Server Computer

Figure 4:
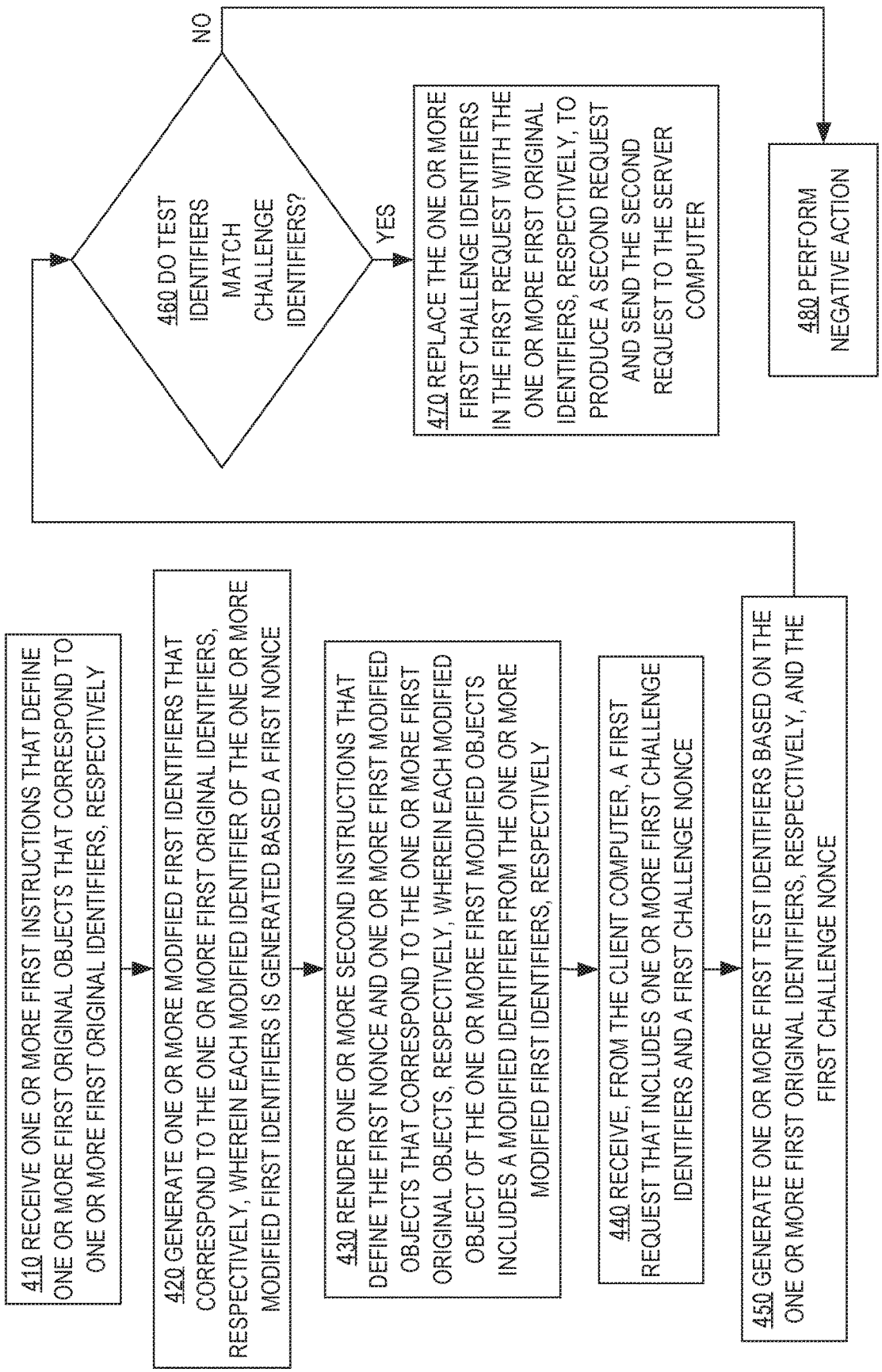
FIG. 4 illustrates a process for adding or modifying one or more objects, and determining whether a request based on the added or modified objects is a valid request, in an example embodiment.

FIG. 4 illustrates a process for adding or modifying one or more objects, and determining whether a request based on the added or modified objects is a valid request, in an example embodiment. In step 410, an intermediary computer receives one or more first instructions that define one or more first original objects that correspond to one or more first original identifiers, respectively. For example, browser 295 on client computer 299 may request original HTML file 110 from a server computer in web infrastructure 205. Browser 295 may send the request to web infrastructure 205 through intermediary computer 230. For purposes of illustrating a clear example, assume the following:

Browser 295 sends a request for original HTML file 110 to intermediary computer 230;

The request for original HTML file 110 includes a URL with a path that includes "/login" and "GET" as the HTTP verb;

Configuration 235 includes data indicating that a request need not be validated if the request includes a particular set identifier comprising "/login" in the path and "GET" as the HTTP verb.

Protocol server logic 338 receives the request and passes the request to validation logic 340. Validation logic 340 determines that the request need not be validated based on the data in configuration 235, and in response, sends the request to a web server in web infrastructure 205 through protocol client logic 332. Protocol client logic 332 may receive original HTML file 110 from the web server computer in web infrastructure 205 in response to the request.

5.2 Modifying Object or Values Using a Deterministic Polymorphic Protocol

In step 420, the intermediary computer generates one or more modified first identifiers that correspond to the one or more first original identifiers, respectively, wherein each modified identifier of the one or more modified first identifiers is generated based on a first nonce. For purposes of illustrating a clear example, assume the following:

Processing logic 334 processes original HTML file 110 and generates a plurality of objects in memory, including original object 120, original object 130, and original object 140;

Original object 120 is an input field in a form and original identifier 122 is "username";

Original object 130 is an input field in the form and original identifier 132 is "password";

Original object 140 is a link object and original identifier 142 is "about-link";

Configuration 235 includes data indicating that, for each original object in the web page, if the original object's identifier is "username", "password", or "security-code", then forward polymorphic logic 336 should generate a modified object identifier based on the original object identifier, a particular PRNG deterministic polymorphic protocol, and a nonce;

Configuration 235 indicates that a new nonce should only be valid for five minutes from when forward polymorphic logic 336 generates the nonce;

Configuration 235 includes data indicating that forward polymorphic logic 336 should generate a new object originally identified as "expiration-time" that includes a value describing a time at which the nonce is no longer valid, modify the identifier based on the new object's original identifier, and encrypt the value in the new object based on the nonce and a particular encryption.

Processing logic 334 may parse or execute original HTML file 110 and generate in-memory objects that correspond to the objects defined in original HTML file 110. Forward polymorphic logic 336 may generate nonce 150 and an expiration timestamp that corresponds to a time that is five minutes in the future. Forward polymorphic logic 336 may generate new identifier 162 based on the original identifier ("expiration-time"), nonce 150, and the particular PRNG deterministic polymorphic protocol. Forward polymorphic logic 336 may generate modified identifier 127, modified identifier 137, and modified identifier 147 based on original identifier 122, original identifier 132, and original identifier 142, respectively, along with nonce 150 and the particular PRNG deterministic polymorphic protocol.

Each of the modified identifiers may be different from the corresponding original identifiers. For example, modified object 125 may include the same data, and be the same type of object, as original object 120, but modified object 125 may include modified identifier 127 rather than original identifier 122. Modified object 135 may include the same data, and be the same type of object, as original object 130, but modified object 135 may include modified identifier 137 rather than original identifier 132. Modified object 145 may include the data, and be the same type of object, as original object 140, but modified object 145 may include modified identifier 147 rather than original identifier 142.

Forward polymorphic logic may generate new object 160 with new identifier 162 based on the particular PRNG deterministic polymorphic protocol and nonce used to generate other modified identifiers in modified HTML file 190. For example, forward polymorphic logic 336 may generate new identifier 162 using the particular PRNG deterministic polymorphic protocol, nonce 150, and the original identifier specified in configuration 235—"expiration-time". New object 160 may include the encrypted timestamp in new object 160 and data identifying the particular PRNG deterministic polymorphic protocol that Forward polymorphic logic 336 used.

Forward polymorphic logic 336 may modify one or more values. For example, forward polymorphic logic 336 may modify the expiration timestamp stored in new object 160 using the particular PRNG deterministic polymorphic protocol and nonce 150.

Forward polymorphic logic 336 may encrypt one or more objects or one or more value(s) in one or more objects. For example, forward polymorphic logic 336 may encrypt the expiration timestamp based on nonce 150, and store the encrypted expiration timestamp in new object 160. Also for example, forward polymorphic logic 336 may generate a value that represents the particular PRNG deterministic polymorphic protocol that forward polymorphic logic 336 is using to generate or modify objects. Forward polymorphic logic 336 may encrypted the value and store the encrypted value in new object 160. Additionally or alternatively, forward polymorphic logic 336 may store nonce 150 in storage 240. Forward polymorphic logic 336 may store a nonce expiration timestamp that is associated with the nonce in storage 240. Forward polymorphic logic 336 may store, in storage 240, a value associated with the nonce that identifies the particular PRNG deterministic polymorphic protocol used with the nonce to generate the modified objects or values. Forward polymorphic logic 336 need not store each original identifier and modified identifier in storage 240 and a mapping between each original identifier the corresponding modified identifier.

5.3 Generating a Modified Html File Using a Deterministic Polymorphic Protocol

In step 430, the intermediary computer renders one or more second instructions that define the first nonce and one or more first modified objects that correspond to the one or more first original objects, respectively, wherein each modified object of the one or more first modified objects includes a modified identifier from the one or more modified first identifiers, respectively. For example, forward polymorphic logic 336 generates modified HTML file 190, which defines a form object that includes modified object 125 with modified identifier 127, modified object 135 with modified identifier 137, modified object 145 with modified identifier 147, nonce 150, and new object 160 with new identifier 162. Accordingly, when a browser generates a request based on the form, the request may include modified identifier 127, modified identifier 137, modified identifier 147, nonce 150, and new identifier 162.

Additionally or alternatively, forward polymorphic logic 336 may add one or more instructions to modified HTML file 190, which when executed by a browser, cause the browser to store nonce 150 or one or more other objects, identifiers, or values in one or more cookies. Each time a legitimate browser sends a request, the browser may include the one or more cookies in with nonce 150 and the one or more objects.

5.4 Validating a Request Based on a Deterministic Polymorphic Protocol

In step 440, the intermediary computer receives, from the client computer, a first request that includes one or more first challenge identifiers and a first challenge nonce. For purposes of illustrating a clear example, assume the following:

- In response to a user selecting a submit button in the form comprising modified object 124 and modified object 135, browser 295 sends a request to intermediary computer 230 that includes a URL with "/login" in the path, "POST" as the HTTP verb, and three challenge parameters;
- Configuration 235 includes data indicating that a request with "/login" in the path and "POST" as the HTTP verb comprises a particular set identifier that is associated with, should be validated based on, a particular set of expected parameters and the particular PRNG deterministic polymorphic protocol in the example in step 420;
- The particular set of expected parameters includes (1) original identifier 122 ("username"), (2) original identifier 132 ("password"), and (3) the original identifier ("expiration-time") that new identifier 162 is based on, in that particular order;
- Browser 295 sends a cookie with a challenge nonce to intermediary computer 230.

Protocol server logic 338 receives the request and passes the request with the challenge parameters and the challenge nonce to validation logic 340. The request with the test identifier(s) may include data that specifies the particular order of the challenge parameters in the request. Additionally or alternatively, the challenge parameters may be in a data structure in the request that indicates the particular order that the challenge parameters are in. Validation logic 340 may search or query configuration 235 for a set of expected parameters associated with a request that includes a URL with "/login" in the path and "POST" as the HTTP verb. In response, validation logic 340 may find or receive the particular set of expected parameters. Accordingly, validation logic 340 may determine that validation logic 340 should validate the response based on the particular set of expected parameters, the challenge nonce, and the challenge parameters before sending the request to web infrastructure 205.

In step 450, the intermediary computer generates one or more first test identifiers based on the one or more first original identifiers, respectively, and the first challenge nonce. Continuing with the current example, validation logic 340 generates a first test identifier by using the particular PRNG deterministic polymorphic protocol, the first expected parameter ("username"), and the challenge nonce. Validation logic 340 generates a second test identifier by using the particular PRNG deterministic polymorphic protocol, the second expected parameter ("password"), and the challenge nonce. Validation logic 340 generates a third test identifier by using the particular PRNG deterministic polymorphic protocol, the third expected parameter ("expiration-time"), and the challenge nonce.

A request need not include all modified identifiers or values in a web page. In the current example, the request does not include modified identifier 147. Modified object 125 and modified object 135 are fields in a form for logging into a web site. However, modified object 145 is a link, which is a link, which links to an about web page, with the original identifier "about-link". Since the about link (modified object 145 in modified HTML file 190) is not germane to validating a request to login to a web site, forward polymorphic logic 336 need not have included instructions in modified HTML file 190 that cause modified identifier 147 to be included in a request to login to the web site. Similarly, forward polymorphic logic 336 need not have included instructions that would have caused browser 295 to include modified identifier 127 or modified identifier 137 in a request generated by browser 295 in response to a user selecting the about link (modified object 145). As shown in this example, forward polymorphic logic 336 need not generate instructions in modified HTML file 190 that cause browser 295 to send a request with an encrypted data structure that maps the modified identifiers to an original identifier. Furthermore, forward polymorphic logic 336 may generate instructions in modified HTML file 190 that cause browser 295 to send a select one or more modified identifiers or values associated with a selected object in the request that browser 295 generates. But, forward polymorphic logic 336 need not generate instructions in modified HTML file 190 that cause browser 295 to include one or more modified identifiers or values in modified HTML file 190 that are not associated with a selected object.

In step 460, the intermediary computer determines whether the test identifier(s) match the challenge identifier(s). For example, validation logic 340 whether each of the following conditions are true:
- The first test identifier matches the first challenge identifier;
- The second test identifier matches the second challenge identifier;
- The third test identifier matches the third challenge identifier.

In response to determining that each test identifier match the corresponding challenge identifier, control may proceed to step 470; otherwise, control may proceed to step 480. In this example, the first, second, and third expected parameters and challenge parameters are in a particular order. If the challenge parameters are not in the same order as the expected parameters, then validation logic 340 may determine that the request is not valid. However, in an embodiment, no particular order is required: Validation logic 340 may compare each test identifier to each challenge identifier. If validation logic 340 determines that each test identifier matches a challenge identifier, then validation logic 340 may determine that the request is valid and control may proceed to stop 470; otherwise, control may proceed to step 480.

In the previous example, validation logic 340 generated a test identifier for each expected parameter. However, if validation logic 340 determines that a test identifier does not match a corresponding challenge identifier, then validation logic 340 may proceed to step 480 without generating any additional test identifiers to validate the request. For example, validation logic 340 may generate a first test identifier using the particular PRNG deterministic polymorphic protocol, the first expected parameter ("username"), and the challenge nonce. If the first test identifier matches the first challenge identifier, then validation logic 340 may generate a second test identifier using the particular PRNG deterministic polymorphic protocol, the second expected parameter ("password"), and the challenge nonce. If the second test identifier does not match the second challenge identifier, then then control may pass to step 480 without validation logic 340 generating a third test identifier.

5.4.1 Validating Requests Based on One or More Parameters

Validation logic 340 may determine whether the request is valid based one or more values in the request that satisfy one or more criteria in configuration 235. For example, configuration 235 may include data indicating that a request that includes a particular set identifier, such as "/login" in the path and "POST" as the HTTP verb, should include a nonce expiration timestamp associated with the third challenge identifier, which corresponds to the "expiration-time" identifier. Configuration 235 may include data indicating that the nonce expiration timestamp should be greater than a timestamp that corresponds with the current time, which indicates that nonce has not expired yet. Accordingly, in step 460, validation logic 340 may generate a new timestamp that corresponds with the current time. If the new timestamp is equal to or greater than the nonce expiration timestamp associated with the third challenge identifier ("expiration-time"), then validation logic 340 may determine that the request is invalid and control may proceed to step 480; otherwise, control may proceed to step 470. If the configuration 235 indicates that the nonce expiration timestamp is encrypted based on the challenge nonce, which in this example is nonce 150, then validation logic 340 may decrypt the expiration timestamp based on the challenge nonce.

Additionally or alternatively, validation logic 340 may query storage 240 for the challenge nonce. If validation logic 340 receives the challenge nonce from storage 240, then validation logic 304 may determine that the challenge nonce is valid. If validation logic 340 receives the challenge nonce from storage 240 with one or more criteria, such as an expiration timestamp, then validation logic 340 may determine whether the one or more criteria are satisfied. If so, validation logic 340 may determine the challenge nonce is valid; otherwise, validation logic 340 may determine that the challenge nonce is invalid. For example, if a criterion is an expiration timestamp, then validation logic 340 may generate a timestamp that corresponds with the current time and determine if the timestamp is less than the expiration timestamp. If so, then validation logic 340 may determine that the nonce is valid; otherwise, validation logic 340 may determine that the nonce is invalid. If validation logic 340 does not receive the challenge nonce, or data or criteria associated with the challenge nonce, from storage 240, then validation logic 340 may determine that the challenge nonce is invalid. If validation logic 340 determines that the nonce is valid, then validation logic 340 may delete the nonce and any data or criteria associated with the nonce from storage 240 so that a browser or bot cannot send another request with the same nonce. If validation logic 340 determines that the challenge nonce is valid, then control may proceed to step 470; otherwise, control may proceed to step 480. In an embodiment, validation logic 340 may determine whether a challenge nonce is valid before determining whether challenge parameters match the test parameters based on the challenge nonce. Accordingly, if the challenge nonce is invalid, then validation logic 340 need not generate the test parameters or compare the test parameters to the challenge parameters.

5.5 Generating a New Request Based on One or More Original Identifiers or Values In step 470, the intermediary computer replaces the one or more first challenge identifiers in the first request with the one or more first original identifiers, respectively, to produce a second request and sends the second request to the server computer. Accordingly, reverse polymorphic logic 342 may generate the second request such that the second request would have been the request that browser 295 would have sent to web infrastructure 205 if the first set of instructions that were intercepted and modified by intermediary computer 230 had been sent directly to browser 295. For example, reverse polymorphic logic 342 may generate a new request that includes the data and key-value pairs in the validated request. However, reverse polymorphic logic 342 may replace the first challenge identifier, modified identifier 127, with the first expected parameter, original identifier 122 ("username"). Reverse polymorphic logic 342 may replace the second challenge identifier, modified identifier 137, with the second expected parameter, original identifier 132 ("password"). Reverse polymorphic logic 342 may replace the third challenge identifier with the third expected parameter ("expiration-time"). Additionally or alternatively, reverse polymorphic logic 342 may remove one or more parameters or values added by forward polymorphic logic 336. For example, reverse polymorphic logic 342 may remove nonce 150 and the key-value pair with "expiration-time" as the key, from the request. Reverse polymorphic logic 342 may send the new request to web infrastructure 205 through protocol client logic 332.

5.6 Performing a Negative Action

In step 480, the intermediary computer performs a negative action. For example, validation logic 340 may terminate the request. Additionally or alternatively, validation logic 340 may respond with a message stored in configuration 235 and defined by a user or administrator through a client computer or the intermediary computer. Additionally or alternatively, validation logic 340 respond with one or more standard or proprietary error codes or messages. For example, validation logic 340 may return HTTP error code 400 and a message "Bad Request" to browser 295 or client computer 299.

6.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 5:
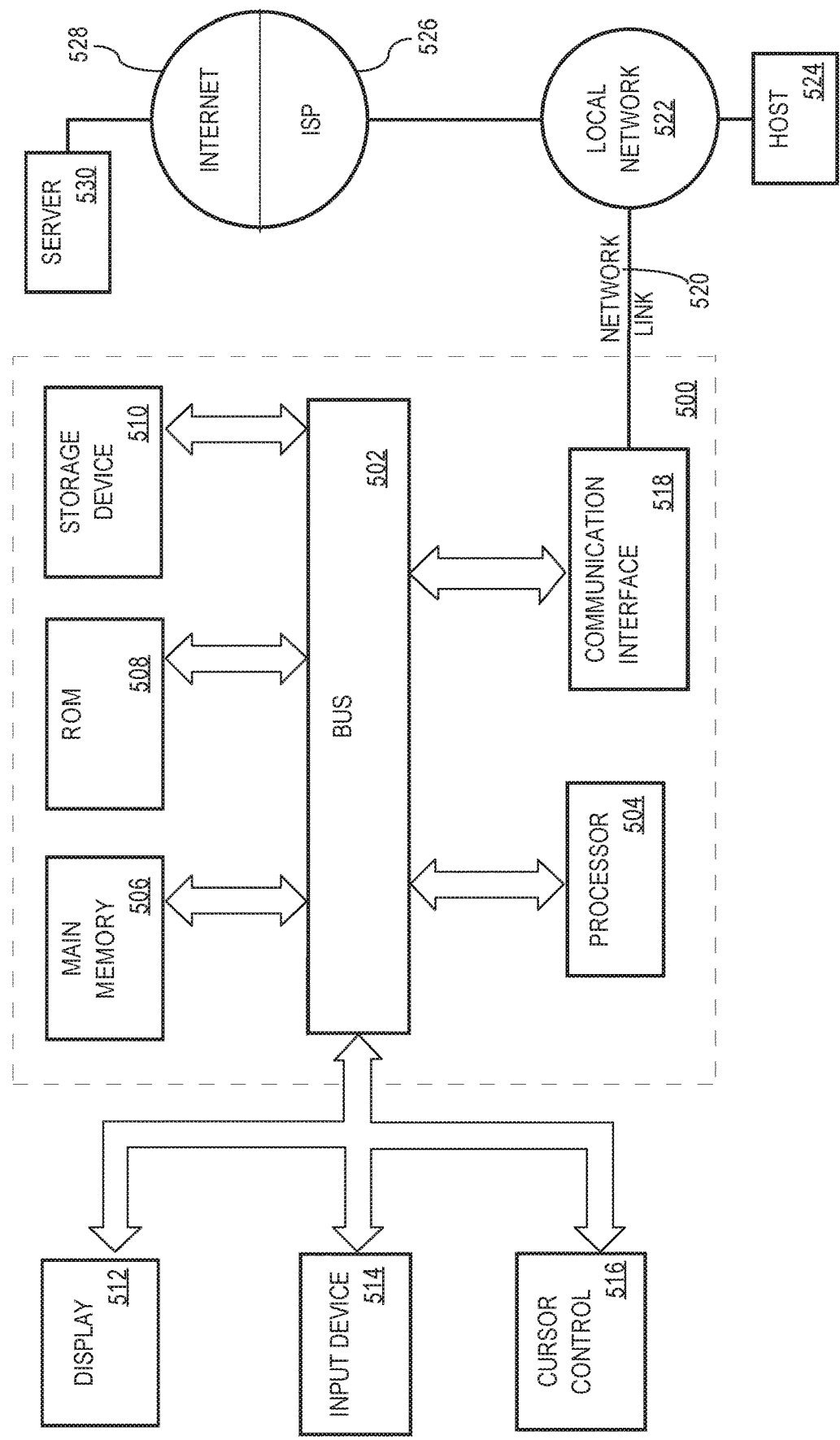
FIG. 5 is a block diagram that illustrates a computer system 500 upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, or stored in storage device 510, or other non-volatile storage for later execution.

7.0 OTHER ASPECTS OF DISCLOSURE

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of client computers interacting with server computers comprising: a memory; one or more processors coupled to the memory and configured to: generate a first modified identifier for a first original object defined in one or more first instructions based on a first original identifier for the first original object and a first nonce; render one or more second instructions that include the first nonce and define a first modified object that corresponds to the first original object and includes the first modified identifier, wherein the one or more second instructions, when executed by a client computer, are configured to cause the client computer to send a request from the client computer with the first modified identifier and the first nonce; send the one or more second instructions to the client computer; receive, from the client computer, a first request with a first challenge identifier and a first challenge nonce; generate a first test identifier based on the first original identifier and the first challenge nonce for validating the first request from the client computer; determine whether the first test identifier matches the first challenge identifier; validate the first request from the client computer based on determining whether the first test identifier matches the first challenge identifier.

2. The computer system of claim 1, wherein the one or more processors are further configured to, prior to generating the first modified identifier, receive the one or more first instructions that define the first original object with the first original identifier, wherein the one or more first instructions are configured to cause one or more requests to be sent to a server computer when executed by a client computer.

3. The computer system of claim 1, wherein: the first challenge nonce and the first nonce have a same value; and the one or more processors are further configured, in response to determining that the first test identifier matches the first challenge identifier, which are based on the same value, to replace the first challenge identifier with the first original identifier in the first request to produce a second request; and to send the second request to a server computer.

4. The computer system of claim 1, wherein: the first challenge nonce and the first nonce do not have a same value; and the one or more processors are further configured, in response to determining that the first test identifier does not match the first challenge identifier, which not based on the same value, to perform a negative response.

5. The computer system of claim 4, wherein the negative response is terminating the first request without forwarding the first request to a server computer.

6. The computer system of claim 1, wherein the one or more processors are further configured to: receive the one or more first instructions that define the first original object with the first original identifier; generate a second modified identifier for the first original object based on the first original identifier and a second nonce, wherein the second nonce is different than the first nonce and the second modified identifier is different than the first modified identifier; render one or more third instructions that include the second nonce and define a second modified object that corresponds to the first original object and includes the second modified identifier; send the one or more third instructions to a client computer, wherein the one or more third instructions, when executed by the client computer, are configured to cause the client computer to send a request from the client computer with the second modified identifier and the second nonce; receive, from the client computer, a third request with a second challenge identifier and a second challenge nonce, wherein the second challenge nonce and the first nonce have a same value and the second challenge nonce and the second nonce do not have the same value; generate a second test identifier based on the first original identifier and the second challenge nonce; determine that the second test identifier does not match the second challenge identifier, and in response, perform a negative response.

7. The computer system of claim 1, wherein the one or processors are configured to generate the first nonce with a pseudo-random number generator.

8. The computer system of claim 1, wherein the first modified identifier is further based on a first function.

9. The computer system of claim 8, wherein the first function comprises a deterministic pseudo-random number generator.

10. The computer system of claim 8, wherein the first function comprises a deterministic cryptographic function.

11. A method, comprising: generating a first modified identifier for a first original object defined in one or more first instructions based on a first original identifier for the first original object and a first nonce; rendering one or more second instructions that include the first nonce and define a first modified object that corresponds to the first original object and includes the first modified identifier, wherein the one or more second instructions, when executed by a client computer, are configured to cause the client computer to send a request from the client computer with the first modified identifier and the first nonce; sending the one or more second instructions to the client computer; receiving, from the client computer, a first request with a first challenge identifier and a first challenge nonce; generating a first test identifier based on the first original identifier and the first challenge nonce for validating the first request from the client computer; determining whether the first test identifier matches the first challenge identifier; validating the first request from the client computer based on determining whether the first test identifier matches the first challenge identifier; wherein the method is performed using one or more processors.

12. The method of claim 11, further comprising: prior to generating the first modified identifier, receiving the one or more instructions that define the first original object with the first original identifier, wherein the one or more first instructions are configured to cause one or more requests to be sent to a server computer when executed by a client computer.

13. The method of claim 11, further comprising: wherein the first challenge nonce and the first nonce have a same value; and in response to determining that the first test identifier matches the first challenge identifier, which are based on the same value, replacing the first challenge identifier with the first original identifier in the first request to produce a second request; and sending the second request to a server computer.

14. The method of claim 11, further comprising: wherein the first challenge nonce and the first nonce do not have a same value; and in response to determining that the first test identifier does not match the first challenge identifier, which are not based on the same value, performing a negative response.

15. The method of claim 14, wherein the negative response is terminating the first request without forwarding the first request to a server computer.

16. The method of claim 11, further comprising: receiving the one or more first instructions that define the first original object with the first original identifier; generating a second modified identifier for the first original object based on the first original identifier and a second nonce, wherein the second nonce is different than the first nonce and the second modified identifier is different than the first modified identifier; rendering one or more third instructions that include the second nonce and define a second modified object that corresponds to the first original object and includes the second modified identifier; sending the one or more third instructions to a client computer, wherein the one or more third instructions, when executed by the client computer, are configured to cause the client computer to send a request from the client computer with the second modified identifier and the second nonce; receiving, from the client computer, a third request with a second challenge identifier and a second challenge nonce, wherein the second challenge nonce and the first nonce have a same value and the second challenge nonce and the second nonce do not have the same value; generating a second test identifier based on the first original identifier and the second challenge nonce; and determining that the second test identifier does not match the second challenge identifier, and in response, perform a negative response.

17. The method of claim 11, further comprising generating the first nonce with a pseudo-random number generator.

18. The method of claim 11, wherein generating the first modified identifier is further based on a first function.

19. The method of claim 18, wherein the first function comprises a deterministic pseudo-random number generator.

20. The method of claim 18, wherein the first function comprises a deterministic cryptographic function.

* * * * *